Patented Sept. 28, 1943

2,330,570

UNITED STATES PATENT OFFICE 2,330,570

HALO ACETAL

Edward M. Filachione, Akron, Ohio, assignor to Monsanto Chemical Company, St. Louis, Mo., a corporation of Delaware No Drawing. Application July 31, 1940, Serial No. 348,841

11 Claims. (Cl. 260—615)

This invention relates to the preparation of halo acetals such as the acetals of haloaldehydes. In accordance with the present invention, I have been able to prepare haloacetals by treatment of vinyl type esters with halogen such as chlorine or bromine in the presence of an alcohol, particularly an aliphatic alcohol such as ethyl or methyl alcohol. Similar acetals may be prepared by halogenating the vinyl type esters and treating the halogenated product with a suitable alcohol.

The invention is particularly applicable to the treatment of vinyl esters such as vinyl acetate, vinyl propionate, vinyl butyrate, vinyl chloroacetate, vinyl chloropropionate, etc. However, other esters of the vinyl type may be treated in accordance with my invention. Thus, esters having the following characteristic structure may be employed

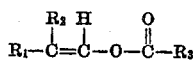

where $R_1$, $R_2$, are hydrogen, or organic radicles, such as methyl, ethyl, propyl, butyl, chloromethyl, chloroethyl, bromomethyl, bromopropyl, etc., and $R_3$ is an organic radicle, such as methyl, ethyl, chloromethyl, bromomethyl, etc.

The process may be conducted by the addition of halogen to vinyl acetate or similar ester in the presence of the desired alcohol. Thus, if methyl or ethyl acetals are desired, the halogenation may be conducted in the presence of methyl or ethyl alcohol. Similarly, the acetals of other alcohols such as propyl, butyl, amyl, hexyl, lauryl, benzyl, chloropropyl, chloroethyl, chlorobutyl, bromoethyl, etc., or secondary or tertiary alcohols such as isopropyl alcohol or isobutyl alcohol or tertiary butyl alcohol may be prepared by conducting the halogenation in the presence of the respective alcohol desired.

If desired, the acetals may be prepared by means of a two-stage process wherein the corresponding ester of a 1,2-dihalo alcohol such as an $\alpha,\beta$-dihalo ethyl ester may be prepared by halogenation of the vinyl ester and the resulting dihalo ester may be reacted with alcohols to form the corresponding acetal. Thus, vinyl acetate or similar esters may be halogenated to form the corresponding dihalo ethyl acetate and this ester may be reacted with methyl, ethyl, propyl, or similar alcohol to form the acetal. If desired, suitable diluents such as chloroform, carbon tetrachloride, benzene, or other inert diluent which may be conveniently separated by distillation from the acetal to be produced may be used. However, the use of a diluent may be omitted, if desired.

The halogenation may be conducted at room temperature or above, if desired, but in order to improve the yields, however, it is found desirable to avoid the use of temperatures which are undesirably high and in most cases it is found that the yield of acetal is improved by conducting the halogenation at comparatively low temperatures, generally below 10° C., and preferably, below 0° C.

Following the halogenation, it is generally found desirable to allow the reaction mixture to stand for a suitable period, generally several hours, in order to permit a more complete reaction to occur and to insure the production of the acetal in high yields. During this period cooling of the mixture is found to be unnecessary and, in general, the mixture is allowed to stand at room temperature, although in some cases the mixture may be heated.

As previously noted, the vinyl ester may be halogenated prior to the introduction of the alcohol. In such a case, the reaction between the halogenated product and the alcohol may be conducted at room temperature or above.

The acetals may be recovered from the reaction mixtures by convenient methods. In accordance with the present invention, I have secured an effective separation by adding water to the mixture and extracting the acetal layer with a water immiscible solvent such as ether, benzene, chloroform, etc. Following recovery of the ether extract, the extract may be washed with water and/or an aqueous alkaline solution such as a solution of sodium bicarbonate to remove acidic or other water soluble constituents and the solvent removed by distillation. Subsequently, the acetal may be purified by distillation or by other suitable methods.

The following examples are illustrative:

*Example I.*—A solution of 43 g. of dry vinyl acetate in 150 cc. of absolute ethyl alcohol was cooled in a closed cooling bath of dry ice in acetone. Accompanied by stirring, a stream of dry chlorine was passed into the solution until 35.5 g. (½ m.) had been added. The mixture was allowed to warm to room temperature and after standing overnight, the reaction mixture was poured into cold water. The ethyl chloroacetal, which separated, was extracted with ether and the ether solution was washed free of acids. After drying, the solvent was removed and the residual ethyl chloroacetal was distilled. In this manner, ethyl chloroacetal was obtained. This compound ($CH_2ClCH(OC_2H_5)_2$) boiled at 53–54°

C. under 16 mm. pressure; $N_D^{20}$ 1.4171; $d_{20}$ 1.017.

*Example II.*—The process was carried out as in Example I, using 86 g. (1 m.) of vinyl acetate dissolved in 200 cc. of methanol and 71 g. of chlorine. This process resulted in the production of methyl chloroacetal ($CH_2ClCH(OCH_3)_2$) (B. P. 124.5 to 126.5° C. at atmospheric pressure, $N_D^{20}$ 1.4150, $d_{20}$ 1.094).

*Example III.*—Air was passed over the surface of 12.5 cc. of liquid bromine and the bromine laden stream of air was led into a solution of 21.5 g. of vinyl acetate in 75 cc. of absolute ethyl alcohol. During the reaction the mixture was stirred, and the temperature was maintained at minus 10° C. The product of reaction, ethyl bromoacetal, was isolated in the same manner as described for isolating ethyl chloroacetal in Example I.

The above process resulted in a yield of 33 g. or 68% of the theoretical amount of ethyl bromoacetal, B. P. 62–53° C. at 15 mm., $d_{20}$ 1.276; $N_D^{20}$ 1.4395.

*Example IV.*—A solution of 64.5 g. (0.75 mole) of vinyl acetate in 150 cc. (3.7 moles) of methyl alcohol was cooled by immersion in an acetone dry ice cooling bath. To this was added, with stirring, a solution of 120 g. (0.75 mol) of bromine in 100 cc. of $CHCl_3$. The temperature of the reaction mixture remained below —40° C. during the entire reaction. The product of the reaction, methyl bromoacetal, was isolated in the same manner as described for ethyl chloroacetal in Example I, and a yield of 46% of the theoretical of methyl bromoacetal which boiled at 48–51° C. at 18 mm. pressure; $d_{20}$ 1.467; $N_D^{20}$ 1.4475 was obtained.

*Example V.*—86 g. of vinyl acetate was cooled, the temperature to about minus 10 to 20° C. and 72 g. of chlorine was added thereto while the mixture was stirred. The resulting reaction mixture was added dropwise to 250 cc. of absolute ethyl alcohol which was stirred as well as cooled by ice. After standing overnight, the ethyl chloroacetal was isolated as in Example I.

*Example VI.*—43 g. of vinyl acetate was cooled to —5° C. and 80 g. of liquid bromine was added dropwise thereto with stirring. The temperature of the reaction mixture remained at 0° C. or below. The resulting reaction mixture was added to 130 cc. of absolute ethyl alcohol at 0° C. After standing for 2 days, ethyl bromoacetal was isolated as in Example III.

Although the present invention has been described with reference to the specific details of certain embodiments thereof, it is not intended that such details shall be regarded as limitations upon the scope of the invention except insofar as included in the accompanying claims.

I claim:

1. A method of preparing a halo acetal which comprises introducing an elemental halogen selected from the group consisting of bromine and chlorine into a mixture of vinyl acetate and a monohydric primary alcohol.

2. A method of preparing a halo acetal which comprises introducing an elemental halogen selected from the group consisting of bromine and chlorine into a mixture of vinyl acetate and a monohydric primary aliphatic alcohol at a temperature not above room temperature.

3. A method of preparing a halo acetal which comprises introducing an elemental halogen selected from the group consisting of bromine and chlorine into an essentially organic mixture of vinyl acetate and a primary aliphatic alcohol at a temperature not above room temperature.

4. The method of claim 1 in which the alcohol is ethyl alcohol.

5. The method of claim 1 in which the alcohol is methyl alcohol.

6. A method of preparing a halo acetal which comprises reacting an elemental halogen selected from the group consisting of bromine and chlorine with vinyl acetate and reacting the halogenation reaction mixture with a monohydric primary alcohol.

7. A method of preparing a halo acetal which comprises reacting an elemental halogen selected from the group consisting of bromine and chlorine with vinyl acetate, adding a monohydric primary aliphatic alcohol to form an essentially organic reaction mixture and permitting the reactants to react.

8. The process of claim 7 wherein the reaction takes place at a temperature not above room temperature.

9. The process of claim 7 in which the alcohol is ethyl alcohol.

10. The process of claim 7 in which the alcohol is methyl alcohol.

11. The process of preparing a halo acetal which comprises reacting a compound of the group consisting of 1,2 dibromo ethyl acetate and 1,2 dichloro ethyl acetate with a monohydric primary aliphatic alcohol.

EDWARD M. FILACHIONE.